(12) United States Patent
Nakanishi (10) Patent No.: US 8,363,035 B2
(45) Date of Patent: Jan. 29, 2013

(54) ILLUMINATION DEVICE, COORDINATE INPUTTING DEVICE, ELECTRO-OPTICAL DEVICE, AND ELECTRONIC APPARATUS

(75) Inventor: Daisuke Nakanishi, Matsumoto (JP)

(73) Assignee: Epson Imaging Devices Corporation (JP)

( * ) Notice: Subject to any disclaimer, the term of this patent is extended or adjusted under 35 U.S.C. 154(b) by 497 days.

(21) Appl. No.: 12/417,243

(22) Filed: Apr. 2, 2009

(65) Prior Publication Data

US 2010/0020334 A1    Jan. 28, 2010

(30) Foreign Application Priority Data

Jul. 24, 2008  (JP) ................. 2008-190547

(51) Int. Cl.
*G06F 3/042* (2006.01)

(52) U.S. Cl. ........ 345/175; 345/173; 345/176; 345/207; 345/104; 178/18.01; 178/18.03; 178/18.09; 178/18.11

(58) Field of Classification Search .......... None
See application file for complete search history.

(56) References Cited

U.S. PATENT DOCUMENTS

| | | | |
|---|---|---|---|
| 7,270,464 B2 | 9/2007 | Nakayoshi et al. | |
| 2009/0046455 A1* | 2/2009 | Yoshino et al. | 362/234 |
| 2009/0139778 A1* | 6/2009 | Butler et al. | 178/18.03 |

FOREIGN PATENT DOCUMENTS

| | | |
|---|---|---|
| JP | 05-040574 | 2/1993 |
| JP | 2004-214094 | 7/2004 |
| JP | 2004-295644 | 10/2004 |
| JP | 2004-303172 | 10/2004 |
| JP | 2007-109447 | 4/2007 |
| JP | 2008-083675 | 4/2008 |
| JP | 2009-157605 | 7/2009 |

* cited by examiner

*Primary Examiner* — Joseph Haley
*Assistant Examiner* — Ifedayo Iluyomade
(74) *Attorney, Agent, or Firm* — Harness, Dickey & Pierce, P.L.C.

(57) ABSTRACT

An illumination device includes a light incident face onto which light is incident, a light guide plate that has a light emitting face that is disposed adjacent to the light incident face and intersects the light incident face, an illumination light source that is disposed to face the light incident face such that an optical axis thereof faces the light incident face, a position detecting beam source that is disposed to face the light incident face such that an optical axis thereof faces the light incident face, and a wiring substrate that extends along the light incident face and has both the illumination light source and the position detecting beam source mounted thereon.

11 Claims, 8 Drawing Sheets

ILLUMINATION DEVICE, COORDINATE INPUTTING DEVICE, ELECTRO-OPTICAL DEVICE, AND ELECTRONIC APPARATUS

The entire disclosure of Japanese Patent Application No. 2008-190547, filed Jul. 24, 2008 is expressly incorporated by reference herein.

BACKGROUND

1. Technical Field

The present invention relates to an illumination device, a coordinate inputting device, an electro-optical device, and an electronic apparatus, and more particularly, to a configuration of an illumination device that is very appropriate to be used in a display device having an optical position detecting unit.

2. Related Art

Generally, in display devices having an electro-optical device such as a liquid crystal display body, in order to allow a display screen to be visually recognized or increase the visibility, an illumination device such as a back light is frequently used. In addition, in the display devices, a pointed position detecting unit such as a touch panel may be disposed in a display screen. In such a case, by pointing a specific spot in the display screen with a pen, a finger, or the like, the pointed position is detected so as to be input to an information processing apparatus or the like.

As a pointed position detection unit (a position coordinate inputting unit) such as the touch panel, an electrostatic capacitance-type touch panel, a resistance film-type touch panel, or the like for mechanically or electrically detecting the state of a contact on the display screen have been known. In addition, other than the above-described touch panels, optical touch panels that can detect positional coordinates of a finger or the like for a case where infrared rays are blocked with the finger or the like, for example, by running a plurality of the infrared rays horizontally and vertically along the display screen and disposing light detectors corresponding thereto for detecting the infrared rays have been known. Generally, various types of optical touch panels have been known. For example, there are touch panels disclosed in JP-A-2004-295644 and JP-A-2004-303172.

However, in the above-described optical touch panels, a plurality of light sources and light detectors, a plurality of light switches, or a plurality of light guiding structures corresponding to resolution of positional coordinates to be detected in the vicinity of the display screen is needed to be arranged. Accordingly, the structure becomes complicated, and the number of optical elements is increased. As a result, there is a problem that a high manufacturing cost incurs.

In addition, by preparing the above-described complicated structure, the thickness of the device is increased or the external dimension of the device may be increased for a case where the structure is disposed on the outer peripheral side for preventing the increase of the thickness of the device.

SUMMARY

An advantage of some aspects of the invention is that it provides an illumination device, a coordinate inputting device, and an electro-optical device (display device) that can be configured in a compact manner at a low cost by configuring a simple optical position detecting unit.

According to a first aspect of the invention, there is provided an illumination device including: a light incident face onto which light is incident; a light guide plate that has a light emitting face that is disposed adjacent to the light incident face and intersects the light incident face; an illumination light source that is disposed to face the light incident face such that an optical axis thereof faces the light incident face; a position detecting beam source that is disposed to face the light incident face such that an optical axis thereof faces the light incident face; and a wiring substrate that extends along the light incident face and has both the illumination light source and the position detecting beam source mounted thereon.

According to the above-described illumination device, the illumination light source and the position detecting beam source that are disposed to face the light incident face of the light guide plate are mounted on a common wiring substrate. Accordingly, the position detecting beam source that configures the position detecting unit can be integrated with the illumination device, and the mounting structure for the light source can be simplified. Therefore, the manufacturing cost can be reduced, and a compact device can be implemented.

In the above-described illumination device, the position detecting beam source may be configured to include a first position detecting beam source and a second position detecting beam source that are disposed to face the light incident faces formed at least on both sides of the light emitting face. In such a case, the first position detecting beam source and the second position detecting beam source are disposed on both sides of the light emitting face. Accordingly, the position of the target object on the light emitting face can be detected by emitting light, which is irradiated from both the light sources, from the light emitting face and detecting light reflected by the target object that is disposed on the light emitting face.

In addition, in the above-described illumination device, the light guide plate may be configured by a plate-shaped body having a polygonal shape in the plan view which uses the light incident face as an end face disposed on an outer edge and uses the light emitting face as a surface. In such a case, in so-called an edge light-type illumination device, a face-shaped illumination body in which illumination light irradiated from the illumination light source and a position detecting beam irradiated from the position detecting beam source can be emitted together from the light emitting face can be configured.

In addition, in the above-described illumination device, it may be configured that the wiring substrate is configured in a band shape in which the illumination light source and the position detecting beam source are arranged along the longitudinal direction and extends in a direction for circling along the end face of the light guide plate. In such a case, the wiring substrate having a band shape on which the light sources are mounted in the form arranged in the longitudinal direction extends along the end face of the light guide plate in the direction for circling. Accordingly, the area of the wiring substrate can be minimized, and therefore the manufacturing cost can be decreased. In addition, the wiring substrate can be installed in a compact manner along the end face of the light guide plate, and thereby a compact device can be implemented.

In addition, in the above-described illumination device, it may be configured that the wiring substrate has a substrate face that faces the end face of the light guide plate, and the illumination light source and the position detecting beam source are mounted on the substrate face and have optical axes perpendicular to the substrate face. In such a case, so-called a top-view-type light source (a chip-shaped light source in which a mounting face and a light emitting face are disposed on opposite sides, for example, an LED of a top-view-type or the like) in which the wiring substrate has a substrate face facing the end face of the light guide plate, and the illumination light source and the position detecting beam sources are mounted on the substrate face so as to have optical axes perpendicular to the substrate face is formed. Accordingly, a process for the wiring substrate can be performed in an easy manner. In addition, the lead-out amount of the light guide plate to the outer side can be decreased in an easy manner, and whereby the external dimension of the illumination device can be configured to be small.

In addition, in the above-described illumination device, it may be configured that the wiring substrate has a substrate face disposed along the surface of the light guide plate, and the illumination light source and the position detecting beam source are mounted on the substrate face and have optical axes formed along the substrate face. In such a case, so-called a side-view-type light source (a chip-shaped light source that is disposed on a face intersected by the mounting face and the light emitting face that are adjacently disposed, for example, an LED of a side-view-type or the like) in which the illumination light source and the position detecting beam source are mounted on the substrate face so as to have optical axes following the substrate face is formed. Accordingly, the wiring substrate can be disposed in a posture having the substrate face that follows the surface of the light guide plate, and accordingly, installation of the wiring substrate can be performed in an easy manner.

In addition, in the above-described illumination device, it may be configured that the wiring substrate has a substrate face disposed along the surface of the light guide plate, the illumination light source and the position detecting beam source are mounted on the substrate face, the illumination light source has an optical axis formed along the substrate face, and the position detecting beam source has an optical axis that is perpendicular to the substrate face. In such a case, the illumination light source is formed as a light source of the side-view-type, and the position detecting beam source is formed as a light source of the top-view-type. Accordingly, various light sources can be formed as light sources of different types in accordance with the use (for illumination and position detection).

In addition, in the above-described illumination device, the wiring substrate may be configured to extend along a first side of the outer edge of the light guide plate and is turned over so as to traverse the light guide plate in the thickness direction in a corner formed between the first side and a second side that is adjacent to the first side and extends further along the second side. In such a case, the wiring substrate is turned over in the corner formed between adjacent two sides. Thus, even when the wiring substrate is configured in a band shape that is stretched in a straight line, the wiring substrate can be installed in a posture in which the substrate face follows the surface of the light guide plate. Accordingly, there is no need for configuring the planar shape of the substrate face of the wiring substrate in a letter "L" shape following two adjacent sides of the outer edge of the light guide substrate or the like. Therefore, the manufacturing cost of the wiring substrate can be reduced, and the handling thereof before assembly can be performed in an easy manner.

In addition, in the above-described illumination device, it may be configured that the wiring substrate extends along a first side of the outer edge of the light guide plate and is turned over in a corner formed between the first side and a second side that is adjacent to the first side, and the position detecting beam source is mounted on the turned-over portion. In such a case, the position detecting beam source is mounted on the turned-over portion of the wiring substrate, and accordingly, the position detecting beam source can be disposed in the corner formed between adjacent sides of the light guide plate.

In addition, as the position detecting beam source that is mounted on the inner face of the center portion of the turned-over portion, a light source of the top-view-type can be used. However, by setting the mounting position of the position detecting beam source to a position deviated from the center of the turned-over portion, a light source of the side-view-type can be used.

In addition, in the above-described illumination device, it may be configured that a plurality of the illumination light sources is arranged along at least one side of the outer edge of the light guide plate, and a plurality of the position detecting beam sources is disposed to face a plurality of sides of the outer edge of the light guide plate or corners of adjacent sides of the outer edge. In such a case, by arranging the plurality of the illumination light sources along at least one side, uniformity of the illumination brightness of the light emitting face of the light guide plate can be improved. In addition, the plurality of the position detecting beam sources are disposed in the corners formed in a plurality of sides or between adjacent sides (that is, any of a case where the plurality of the position detecting beam sources is disposed to face the plurality of sides, a case where the plurality of the position detecting beam sources is disposed to face any side and the corners, or a case where the plurality of the position detecting beam sources is disposed to face a plurality of corners is included). Accordingly, a distance between the position detecting beam sources can be separated sufficiently, and therefore detection of the position can be performed in an easy manner.

According to a second aspect of the invention, there is provided a coordinate inputting device. The coordinate inputting device includes: the above-described illumination device; and a light detecting unit that is disposed on the light emitting side of the light guide plate and detects light irradiated from the position detecting beam source through the light guide plate. To the above-described illumination device, by additionally disposing the light detecting unit (optical sensor) that detects the light irradiated from the position detecting beam source on the light emitting side of the light guide plate, the coordinate inputting device can be configured for inputting the positional coordinates on the light emitting face of the light guide plate. In such a case the control unit that controls the states of light irradiation of the position detecting beam sources and acquires the positional coordinates based on the detection signal of the light detecting unit is disposed.

According to a third aspect of the invention, there is provided an electro-optical device including: the above-described coordinate inputting device; and an electro-optical panel that is disposed on the light emitting side of the light emitting face. By using the above-described illumination device, illumination of the electro-optical panel and built-in of the optical position detecting unit can be implemented by using a simple configuration. Accordingly, a decrease in the manufacturing cost and a compact device can be achieved.

According to a fourth aspect of the invention, there is provided an electronic apparatus including: the above-described electro-optical device; and a control unit of the electro-optical device. As examples of the electronic apparatus, there are a television set, various monitor apparatuses, a cellular phone, an electronic watch, a car navigation system, and various car built-in display apparatuses such as a meta-cluster panel apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the accompanying drawings.

First Embodiment

Figure 1:
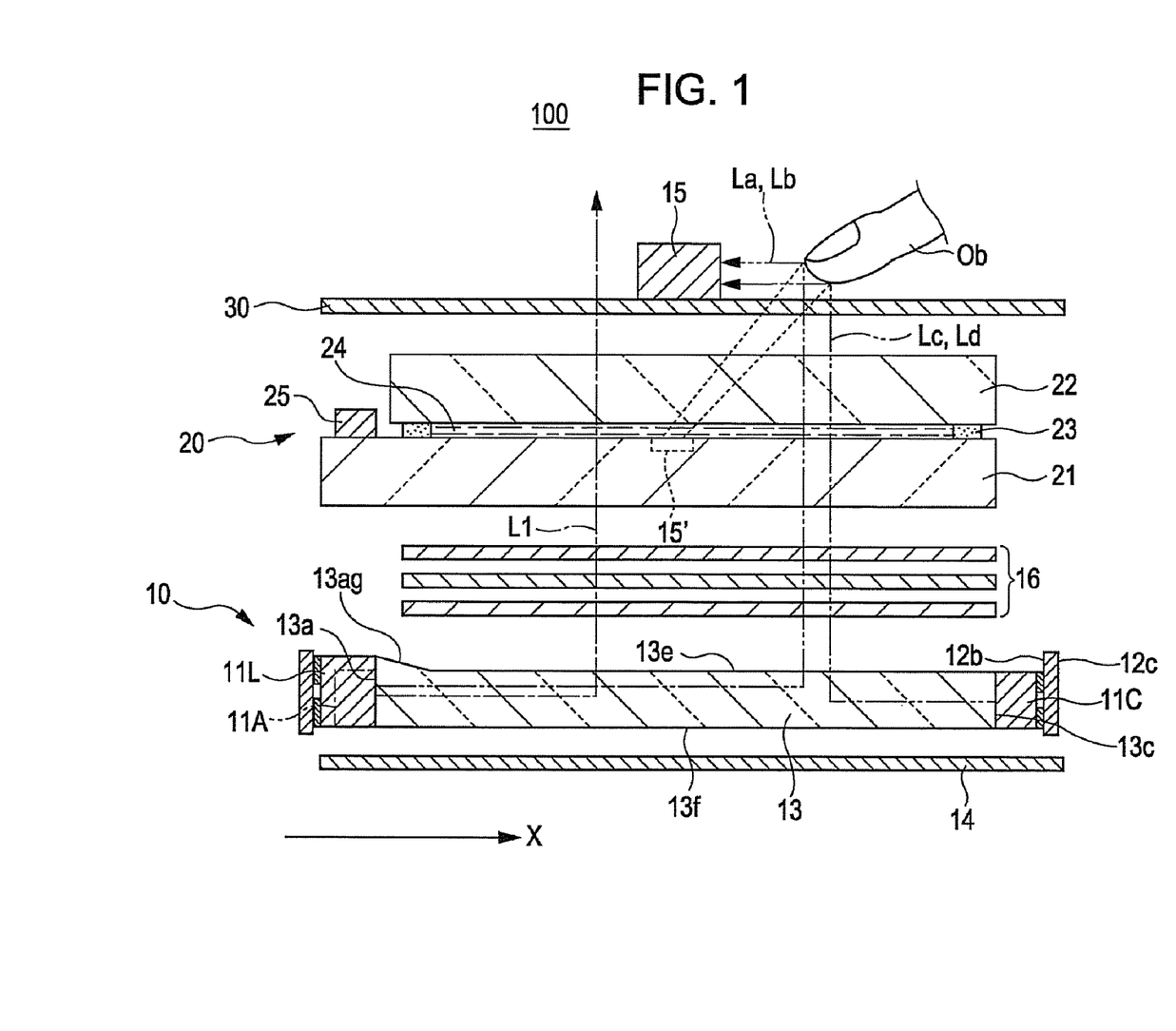
FIG. 1 is a schematic cross-section view showing the configuration of an illumination device and an electro-optical device according to a first embodiment of the invention.
Figure 2A:
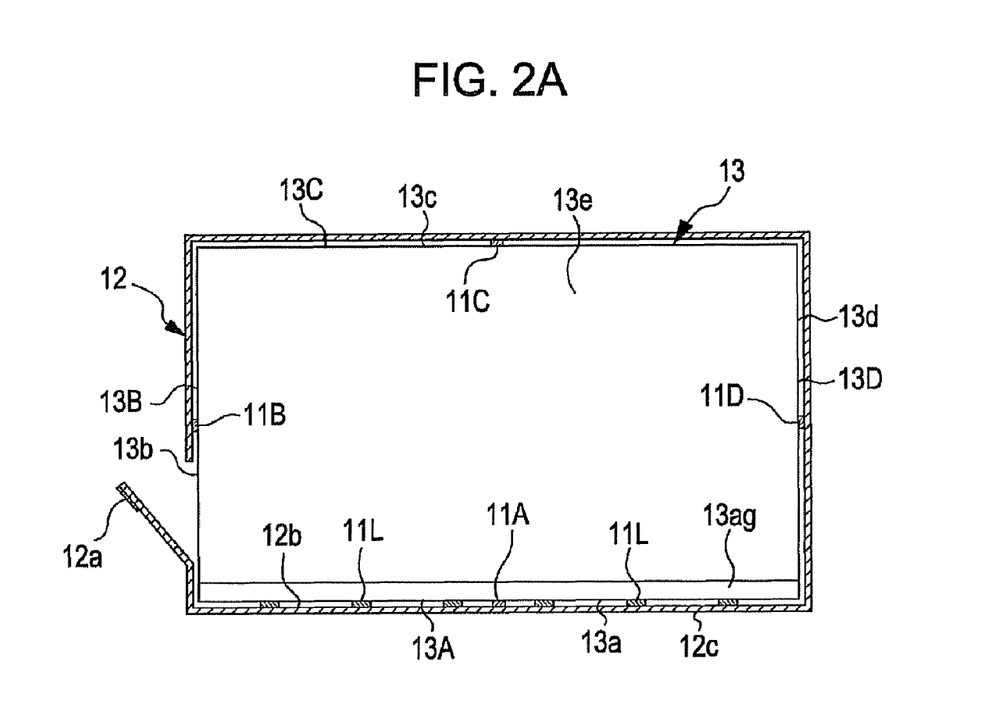
FIG. 2A is a plan view showing positional relationship between light sources and a light guide plate according to the first embodiment.
Figure 2B:
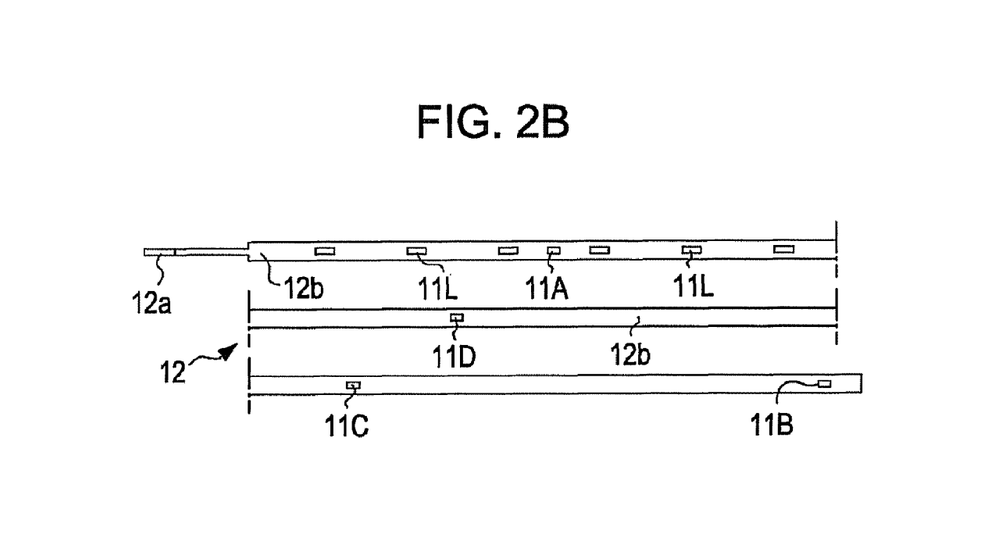
FIG. 2B is a plan view of a wiring substrate according to the first embodiment.

FIG. 1 is a schematic cross-section view showing the configuration of an illumination device and an electro-optical device according to a first embodiment of the invention. FIG. 2A is a plan view showing light sources and a light guide plate of the illumination device. FIG. 2B is a plan view of a wiring plate of the illumination device. In FIG. 2B, for the convenience of illustration, the wiring substrate is shown by being divided by using a section line that is denoted by a dashed dotted line. This also applies to FIGS. 3B and 4B.

The illumination device 10 according to this embodiment includes an illumination light source 11L that emits illumination light L1, position detecting beam sources 11A, 11B, 11C, and 11D that emit position detecting beams La, Lb, Lc, Ld, the wiring substrate 12 on which the light sources are mounted, the light guide plate 13 which light irradiated from the light sources is incident to and emits the light, a reflection plate 14 that is disposed behind the light guide plate 13, and a light detector 15 that is disposed on the emitting side of the position detecting beam.

The light guide plate 13 is configured by a transparent light guiding body that is formed of acrylic resin, polycarbonate resin, or the like. The light guide plate 13 is configured by a plate-shaped body that is in a polygonal shape (in the example shown in the figure, a rectangular shape) in the plan view. In addition, sides 13A, 13B, 13C, and 13D of an outer edge of the light guide plate 13 include light incident faces 13a, 13b, 13c, and 13d that are formed of end faces thereof, a light emitting face 13e formed of a surface that is adjacent to the light incident faces and intersects (in the example shown in the figure, is perpendicular to) the light incident faces, and a back face 13f that is disposed on a side opposite to the light emitting face 13e. In addition, on the light emitting side of the light guide plate 13, optical sheets 16 such as a light diffusing plate used for implementing uniform illumination light and a light collecting plate including a prism sheet or the like for increasing directivity of the illumination light are disposed appropriately, as needed.

On the light emitting side of the illumination device 10, an electro-optical penal 20 that is formed of a transmissive liquid crystal display body or the like is disposed. This electro-optical panel 20, for example, is formed by bonding transparent substrates 21 and 22 by using a sealing material 23 and disposing a liquid crystal 24 between the substrates. The electro-optical panel 20 includes a plurality of pixels that is configured to control the alignment state of the liquid crystal 24 by using electrodes not shown in the figure. In addition, on the outer face side of the substrates 21 and 22, polarizing plates (not shown) are disposed, as needed. Each pixel is driven in accordance with a driving signal output by a driving circuit 25 that is formed of a semiconductor IC chip or the like and is controlled to be in a predetermined transmissive state.

On a side of the electro-optical panel 20 that is opposite to the illumination device 10, a transparent mounting plate 30 is disposed. In addition, on an outer face (a face opposite to the electro-optical panel 20) of the mounting plate 30, a light detector 15 is disposed. This light detector 15 is a light receiving element such as a photo diode and is configured to be able to detect the intensity of the position detecting beam. For example, when the position detecting beam is an infrared ray, the light detector 15 is configured by a light emitting element having sensitivity to an infrared ray.

The illumination light source 11L is configured by a light emitting element such as an LED (light emitting diode) and emits the illumination light L1, for example, of a white color in accordance with a driving signal that is output from the driving circuit that is not shown in the figure. As shown in FIGS. 2A and 2B, a plurality of the illumination light sources 11L is arranged along the light incident face 13a that is disposed on one side 13A.

The position detecting beam sources 11A to 11D are configured by light emitting elements such as LEDs (light emitting diodes) and emit the position detecting beams La to Ld that is, for example, an infrared ray in accordance with driving signals that are output from the driving circuit not shown in the figure. The position detecting beam is not particularly limited. However, it is preferable that the position detecting beam can be detected separately from the illumination light L1 or external light by performing signal processing or the like to be described later. In addition, it is preferable that the position detecting beam has a wavelength distribution and light emitting aspects that are different from those of the illumination light L1. In addition, it is preferable that the position detecting beam has a wavelength range for being effectively reflected by a target object Ob according to an embodiment of the invention. For example, when the target object Ob is a human body such as a finger or the like, it is preferable that the position detecting beam is an infrared ray (in particular, a near infrared ray close to the visible light range) that has high reflectivity for the surface of a human body. A plurality of the position detecting beam sources 11A to 11D is intrinsically installed so as to be configured to emit the position detecting beam at different positions.

As shown in FIGS. 2A and 2B, the illumination light source 11L and the position detecting beam sources 11A to 11D are mounted on the common wiring substrate 12. The wiring substrate 12, as shown in FIG. 2B, is formed in a band shape that is stretched in a straight line. The wiring substrate 12 is acquired by forming a predetermined wiring pattern on the surface or inside a member having flexibility such as polyimide resin. In one end portion of the wiring substrate 12, a narrow connection terminal part 12a that is configured so as to be connected to a wiring member such as an internal wiring substrate or an external wiring substrate of the electro-optical device or a connector is disposed. Wiring patterns that are formed on the wiring substrate 12 are connected to the plurality of the illumination light sources 11L and the plurality of the position detecting beam sources 11A to 11D. Commonly, it is preferable that a wiring connected to the illumination light source 11L and a wiring connected to the position detecting beam sources 11A to 11D are configured by different wirings in at least one electric potential supplying line.

On the substrate face (a face facing the end face of the light guide plate 13 in the plan view shown in FIG. 2A and a surface following the sheet face of the plan view shown in FIG. 2B) 12b of the wiring substrate 12, the illumination light source 11L and the position detecting beam sources 11A to 11D are mounted in a state being arranged in one row in the longitudinal direction of the band shape of the wiring substrate 12. All the illumination light source 11L and the position detecting beam sources 11A to 11D are top-view-type light sources (the mounting face for the wiring substrate 12 and the light irradiating face are on opposite sides of the front and rear faces). The wiring substrate 12 extends in the circling direction along the outer edge of the light guide plate 13 in a posture in which the substrate face 12b is brought to face the end face (the light incident faces 13a to 13d to be described later) of the light guide plate 13, and the rear face 12c, which is located on the opposite side of the substrate face 12b, faces the outer side.

The light guide plate 13 is formed in a rectangular shape in the plan view. In end faces of sides of the light guide plate 13 that face each other, the light incident faces 13a to 13d are disposed. The wiring substrate 12 extends along the sides 13A to 13D of the light guide plate 13 and is disposed in a posture in which the substrate face 12b faces the light incident faces 13a to 13d of the light guide plate 13. In addition, the plurality of the illumination light sources 11L is disposed along a side 13A of the light incident face 13a.

The illumination light L1 is taken inside from the light incident face 13a and propagates through the inside toward the outer edge part (light incident face 13c) located on the opposite side. The light guide plate 13 according to this embodiment has a basic light guiding structure in which the ratio of the light amount of light emitted from the light emitting face 13e to the internally propagated light monotonously increases from the light incident face 13a side toward the outer edge part (in the example shown in the figure, the light incident face 13c) located on the opposite side. This light guiding structure, for example, is implemented by gradually increasing the area of a refracting face, which is formed on the light emitting face 13e or the rear face 13f of the light guide plate 13, having a light deflection or light scattering fine concave-convexo shape, the formation density of the print layer, or the like toward the internal propagation direction. By disposing such a light guide structure, the illumination light L1 that is incident from the light incident face 13a that is an end face located on one side is emitted almost uniformly from the light emitting face 13e. As a result, the light guide plate 13 is configured to serve as a face-shaped light source.

In addition, according to this embodiment, an inclined face 13ag is disposed on a surface portion (an outer peripheral portion of the light emitting face 13e) of the light emitting side that is adjacent to the light incident face 13a. Thus, the thickness of the light guide plate 13 is configured to be gradually increased toward the light incident face 13a in the outer edge portion of the light guide plate 13. By using the light incident structure having the inclined face 13ag, the height of the light incident face 13a is increased so as to respond to the height of the light irradiating face of the illumination light source 11L while suppressing an increase in the thickness of a portion in which the light emitting face 13e is disposed. This responds to a recent request of decreasing the thickness of a display device. Accordingly, the brightness of illumination can be improved by increasing the extraction efficiency of light emitted from the light emitting element (the illumination light source 11L) such as an LED of which miniaturization has not progressed while decreasing the thickness of the light guide plate 13.

The position detecting beam source 11A that is disposed to face the light incident face 13a is disposed on the inside (that is, a center portion of the side 13A or the light incident face 13a in the widthwise direction) of the row of the illumination light source 11L. In addition, on the other sides 13B to 13D, the position detecting beam sources 11B to 11D that are disposed to face the light incident faces 13b to 13d are disposed in center portions of the sides 13B to 13D or the light incident faces 13b to 13d in the widthwise direction. Accordingly, the light incident positions of the position detecting beams La to Ld for the light guide plate 13 can be separated from one another. In particular, the light incident positions of the position detecting beams La and Lc or Lb and Ld that oppose each other can be disposed on both sides of the light emitting face 13e. Accordingly, the accuracy of position detection (detection of coordinates of positions of the light guide plate 13 in the directions of the sides 13A to 13D) by using a position detecting beam to be described later can be improved.

In addition, according to this embodiment, coordinates of positions in a direction for connecting the light incident face 13a and the light incident face 13c are detected by using the position detecting beam source 11A disposed to face the light incident face 13a and the position detecting beam source 11C disposed to face the light incident face 13c. In addition, coordinates of positions in a direction for connecting the light incident face 13b and the light incident face 13d are detected by using the position detecting beam source 11B disposed to face the light incident face 13b and the position detecting beam source 11D disposed to face the light incident face 13d. The detection of the coordinates of the positions may be performed with the position detecting beam sources 11A to 11D disposed in positions (for example, positions near ends or positions of corners) other than the center positions of the sides 13A to 13D.

According to the first embodiment configured as described above, after being incident to the light guide plate 13 from the light incident face 13a, the illumination light L1 propagates the inside thereof and is gradually emitted on a face from the entire light emitting face 13e. Then, after passing through the electro-optical panel 20, the illumination light L1 is transmitted through the mounting plate 30 so as to be emitted on a visible side. This illumination light L1 configures a display image, which is formed by controlling light transmission rates of the pixels of the electro-optical panel 20, to be recognized visually.

On the other hand, after being incident to the light guide plate 13 from the light incident faces 13a to 13d, the position detecting beams La to Ld propagates the inside thereof and is gradually emitted on a face from the entire light emitting face 13e. Then, the position detecting beams La to Ld is transmitted through the electro-optical panel 20 and the mounting plate 30 so as to be emitted. At this moment, when a target object Ob exists on the surface of the mounting plate 30, light reflected from the target object Ob is detected by the light detector 15 that is disposed on the mounting plate 30. The light amount of the reflected light that is detected by the light detector 15 includes contributions of the plurality of the position detecting beams La to Ld.

The position in which the light detector 15 is disposed is not limited to a position located on the mounting plate 30. Thus, the light detector may be disposed on the inside of the electro-optical panel 20 as a light detector 15' shown in the figure. Alternatively, the light detector 15 may be disposed on the surface or the rear surface of the light guide plate 13, as long as it is located in a position in which the light reflected from the target object Ob can be detected.

Next, a method of acquiring the position information of the target object Ob based on detection by using the light detector 15 will be described. As a method of acquiring the position information, various methods may be considered. However, for example, a method of calculating coordinates of the position in the direction for connecting two corresponding light sources by calculating a ratio of attenuation coefficients based on a ratio of detected light amounts of two position detecting rays and calculating a propagation distance of both the position detecting beams based on the ratio of the attenuation coefficients may be used.

In particular, a case where 11A is used as a first position detecting beam source, and 11C is used as a second position detecting beam source will be described. When a control amount (for example, the amount of current), a conversion coefficient, and an amount of emitted light of the first position detecting beam source 11A are denoted by $I_a$, $k_a$, and $E_a$, and a control amount (the amount of current), a conversion coefficient, and an amount of emitted light of the second position detecting beam source 11C are denoted by $I_c$, $k$, and $E_c$, $E_a = k \cdot I_a$ and $E_c = k \cdot I_c$. In addition, when the attenuation coefficient and the detected light amount of the first position detecting beam La are denoted by $f_a$ and $G_a$, and the attenuation coefficient and the detected light amount of the second position detecting beam Lc are denoted by $f_c$ and $G_c$, $G_a = f_a \cdot E_a = f_a \cdot k \cdot I_a$ and $G_c = f_c \cdot E_c = f_c \cdot k \cdot I_c$.

Thus, when $G_a/G_c$ that is a ratio of the detected light amounts of two position detecting beams can be detected by the light detector 15, $G_a/G_c = (f_a \cdot E_a)/(f_c \cdot E_c) = (f_a/f_c) \cdot (I_a/I_c)$. Accordingly, when values corresponding to a ratio $E_a/E_c$ of the emitted light amount and a ratio $I_a/I_c$ of the control amounts are known, the ratio $f_a/f_c$ of the attenuation coefficients can be determined. There is positive correlation between the ratio of the attenuation coefficients and the ratio of propagated distances of both the position detecting beams. Accordingly, by setting the correlation in advance, the position information of the target object Ob (coordinates of the positions in the direction from the first position detecting beam source to the second position detecting beam source) can be acquired.

As a method of calculating the ratio $f_a/f_c$ of the attenuation coefficients, for example, the first position detecting beam source 11A and the second position detecting beam source 11C are turned on and off (for example, driving signals having a square waveform or a sinusoidal waveform are operated so as to have a phase difference of 180 degrees at a frequency at which a phase difference due to a difference of propagation distances can be ignored) in opposite phases and then, the waveform of a detected light amount is analyzed. More practically, for example, the control amount $I_a$ on one side is fixed ($I_a = I_m$), the control amount $I_c$ on the other side is controlled such that the detected waveform cannot be observed (that is, a ratio $G_a/G_c$ of detected light amounts becomes zero), and the ratio $f_a/f_c$ of the attenuation coefficients is derived from the control amount $I_c = I_m \cdot (f_a/f_c)$ at that moment.

Alternatively, it may be controlled such that a sum of two control amounts is constant $I_m = I_a + I_c$, all the time. In such a case, $I_c = I_m \cdot f_c/(f_a + f_c)$. Thus, $f_c/(f_a + f_b) = \alpha$, and a ratio of the attenuation coefficients is acquired by using $f_a/f_c = (1 - \alpha)/\alpha$.

According to this embodiment, position information (coordinates of the position) on the direction of the target object Ob for connecting midpoints of the sides 13A and 13C of the light guide plate 13 can be acquired by driving the first position detecting beam source 11A and the second position detecting beam source 11C in opposite phases. In addition, position information (coordinates of the position) on the direction of the target object Ob for connecting midpoints of the sides 13B and 13D of the light guide plate 13 can be acquired by driving the first position detecting beam source 11B and the second position detecting beam source 11D in opposite phases. Accordingly, by newly changing the detection operation for two directions in a control system, the coordinates of the planar position of the target object Ob can be acquired. In addition, a phase difference of the position detecting beam is detected by emitting a plurality of position detecting beams in a same phase from the light sources, and whereby the position information in direction Z that is perpendicular to the coordinate plane can be acquired.

According to this embodiment, while the electro-optical panel of the type in which the state of optical modulation is controlled for each pixel is illuminated, the position information of the target object Ob on the display screen can be detected. However, the common light guide plate 13 can be used for both illumination and detection of the position, and accordingly, the structure can be configured to be simple. Therefore, manufacturing costs can be reduced, and a compact size of the device can be implemented. In particular, compared to a case where a method in which a plurality of light sources, a plurality of light detectors, a plurality of light switches, or the like are arranged in a general display screen is used, the number of elements used for detection of the position can be decreased markedly. Accordingly, remarkable simplification of the structure, a decrease in the manufacturing costs, and a decrease in the power consumption can be achieved.

In addition, according to this embodiment, all the plurality of the illumination light sources 11L and the plurality of the position detecting beam sources 11A to 11D are mounted on the substrate face 12b of the wiring substrate 12. Thus, even when the wiring substrate 12 has flexibility, labor for assembling the device can be reduced. In addition, a single wiring substrate 12 can be compactly disposed on the outer side of the end face along the plurality of sides of the outer edges of the light guide plate 13, and accordingly, the outer dimension can be decreased. In particular, the wiring substrate 12 is installed to have the substrate face 12b that faces the end face of the outer edge of the light guide plate 13. Accordingly, the width of the frame area that is needed on the outer side of the illumination range of the illumination device 10 can be configured to be small. In addition, in such a case, so-called a top-view-type light source can be used.

In addition, according to this embodiment, the wiring substrate 12 having a band shape that extends in a straight line can be used. Accordingly, the number of installed wiring substrates can be increased so as to increase the manufacturing efficiency. Therefore, there is also an advantage that the manufacturing costs can be reduced.

Second Embodiment

Figure 3A:
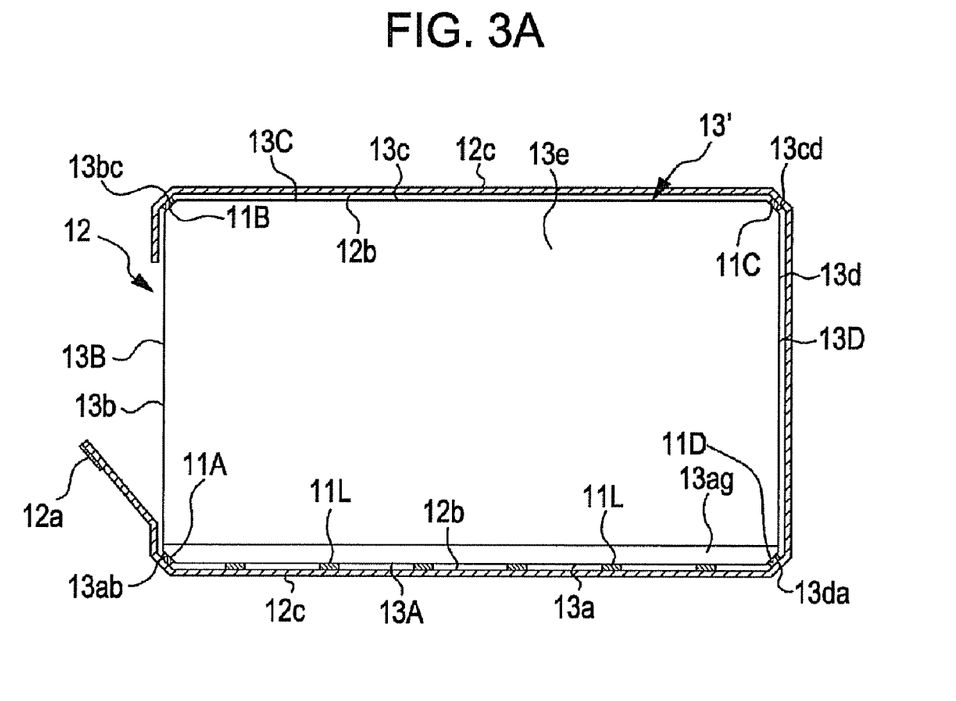
FIG. 3A is a plan view showing positional relationship between light sources and a light guide plate according to a second embodiment of the invention.
Figure 3B:
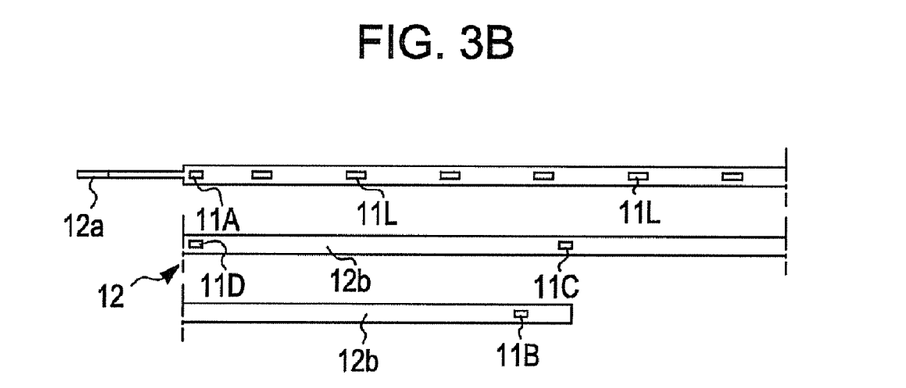
FIG. 3B is a plan view of a wiring substrate according to the second embodiment.

Next, a second embodiment of the invention will be described with reference to FIGS. 3A and 3B. In this embodiment, to each part that is the same as that of the first embodiment, a same reference sign is assigned, and a description thereof is omitted here.

A difference between this embodiment and the first embodiment is that position detecting beam sources 11A to 11D are disposed to face corner portions 13ab, 13bc, 13cd, and 13da located between sides 13A to 13D of a light guide plate 13' according to this embodiment. Each corner portion of the light guide plate 13' is diagonally cut so as to be inclined with respect to any side on both adjacent sides, and flat light incident parts that face light irradiating faces of the position detecting beam sources 11A to 11D on the front side are disposed.

According to this embodiment, on both sides of a row of a plurality of illumination light sources 11L that is arranged along the side 13A of the light guide plate 13', the position detecting beam sources 11A and 11D are disposed so as to be mounted on a substrate face 12b of a wiring substrate 12.

According to this embodiment, position information of a direction for connecting the corner portions 13ab and 13cd of the light guide plate 13' can be acquired by light irradiated from the position detecting beam source 11A and light irradiated from the position detecting beam source 11C that have predetermined phase relationship with each other, as described above. In addition, position information of a direction for connecting the corner portions 13bc and 13da of the light guide plate 13' can be acquired by light irradiated from the position detecting beam source 11B and light irradiated from the position detecting beam source 11D that have predetermined phase relationship with each other, as described above. In addition, position information of a direction along the sides 13A and 13C can be acquired by light irradiated from the position detecting beam sources 11A and 11B and light irradiated from the position detecting beam sources 11C and 11D that have predetermined phase relationship with each other. In addition, position information of a direction along the sides 13B and 13D can be acquired by light irradiated from the position detecting beam sources 11A and 11D and light irradiated from the position detecting beam sources 11B and 11C that have predetermined phase relationship with each other.

According to this embodiment, the position detecting beam sources 11A to 11D are disposed to face the corner portions 13ab, 13bc, 13cd, and 13da of the light guide plate 13', and accordingly, the position detecting beam sources can be disposed without influencing the arrangement of the plurality of the illumination light source 11L that is arranged along the side 13A.

In addition, the corner portions 13ab, 13bc, 13cd, and 13da that the position detecting beam sources 11A to 11D are disposed to face are configured to be flat having a cut shape, and accordingly, light irradiated from the position detecting beam sources can be introduced into the inside of the light guide plate 13 efficiently.

Third Embodiment

Figure 4A:
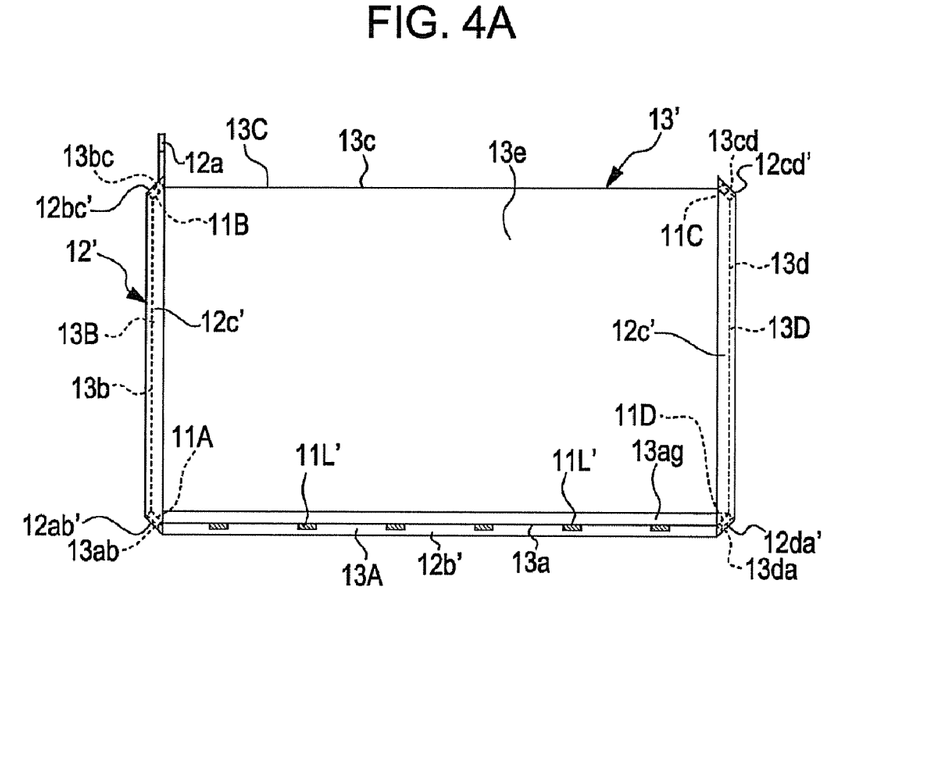
FIG. 4A is a plan view showing positional relationship between light sources and a light guide plate according to a third embodiment of the invention.
Figure 4B:
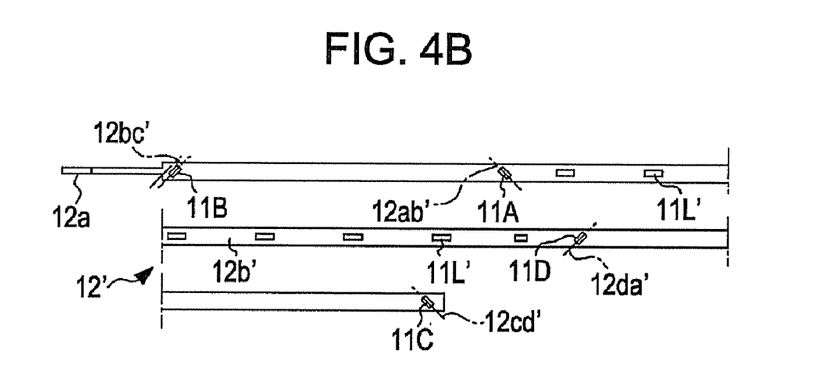
FIG. 4B is a plan view of a wiring substrate according to the third embodiment.

Next, a third embodiment of the invention will be described with reference to FIGS. 4A and 4B. In this embodiment, to each part that is the same as that of the second embodiment, a same reference sign is assigned, and a description thereof is omitted here.

This embodiment has the same light guide plate 13' as that of the second embodiment. A difference between this embodiment and the second embodiment is that a wiring substrate 12' of this embodiment is disposed in a posture in which a substrate face 12b' follows the surface (a light incident face 13e and a back face 13f) of the light guide plate 13' while the substrate face 12b of the wiring substrate 12 is disposed so as to face the end face (the light incident faces 13a, 13b, 13c, and 13d) of the light guide plate 13' in the second embodiment, same as in the first embodiment. In addition, in correspondence with this, an illumination light source 11L' according to this embodiment is a side-view-type light source (in which a mounting face for the wiring substrate 12' and a light irradiating face intersect (are orthogonal)).

In an area in which the illumination light sources 11L' follow a side 13A of the light guide plate 13' oppositely disposed, in order to dispose the side-view-type illumination light source 11L' to face a light incident face 13a, the substrate face 12b' of the wiring substrate 12' is disposed along a back face 13f (on the back side of the back face 13f) of the light guide plate 13'. However, the front side and the rear side are reversed at the corner portions between the sides 13A and 13B and 13D, and the extending direction is refracted at a right angle and turned over so as to traverse the light guide plate 13' in the thickness direction. Accordingly, a portion of the substrate face 12b' that extends along the sides 13B and 13D is configured to be disposed on a peripheral portion of the light emitting face 13e along end faces 13b and 13d of the light guide plate 13'.

In other words, the wiring substrate 12' extends along the side 13A in a posture in which the substrate face 12b' faces the back face 13f of the light guide plate 13' on the back face 13f (see FIG. 1) of the light guide plate 13'. However, the wiring substrate 12' is turned over at the corners on both sides and changes the extending direction by 90 degrees so as to be stretched along the sides 13B and 13D. Thus, the wiring substrate 12' extends in a posture in which the substrate face 12b' faces the light emitting face 13e on the surface side of the light guide plate 13', that is, a posture in which the rear face 12c' located on the opposite side of the substrate face 12b' faces the upper side (the light emitting side). Accordingly, the wiring substrate 12' is configured in a "π" shape in the plan view along the sides 13A, 13B, and 13D, on the whole.

In addition, the end portions of the wiring substrate 12' are turned over further at the corners between the sides 13B and 13D and 13C in the thickness direction of the light guide plate 13'. In a total of four spots of the turned-over portions, position detecting beam sources 11A to 11D are mounted. In the turned-over portions, the position detecting beam sources 11A to 11D are mounted to be disposed on the inner side of the turned-over portions, and the light irradiating face faces the corners 13ab, 13bc, 13cd, and 13da of the light guide plate 13' having a cut shape that is the same as that of the second embodiment. In other words, the position detecting beam sources 11A to 11D are formed as top-view-type light sources, and the mounting face is fixed to the inner face of the turned-over portion, and a face located on a side opposite to the mounting face is disposed to face the corners of the light guide plate 13' on the light irradiating face.

The center lines 12ab', 12bc', 12cd', and 12da' of the turned-over portions of the wiring substrate 12' are inclined by an angle (in the example shown in the figure, 45 degrees) corresponding to the turned-over angle (in the example shown in the figure, 90 degrees) with respect to the longitudinal direction of the wiring substrate 12' or a direction perpendicular thereto. In addition, the position detecting beam sources 11A to 11D are mounted in an inclined posture along the center lines 12ab', 12bc', 12cd', and 12da'. Accordingly, the position detecting beam sources 11A to 11D are posed to face the corners in the turned-over portions of the wiring substrate 12'.

In addition, in this embodiment, the wiring substrate 12' is turned over by another turned-over line, which is adjacent and parallel to the turned-over line 12bc', in the thickness direction of the light guide plate 13', and a connection terminal part 12a disposed on the end portion protrudes in a direction along the side 13B. Accordingly, the connection terminal part 12a can be derived in a position not overlapped with the light guide plate 13'.

According to this embodiment, as the illumination light source 11L', a side-view-type light source can be used. Generally, this improves a decrease of the thickness of the illumination device. In addition, even in such a case, the wiring substrate 12' can be formed in a band shape extending in a straight line, and accordingly, there is an advantage in terms of manufacturing costs.

According to this embodiment, the position detecting beam sources 11A to 11D are top-view-type light sources, same as in the first embodiment. In such a case, by using the position detecting beam sources of a type different from that of the illumination light source 11L' that is a side-view-type light source, light sources can be optimized in accordance to uses for illumination and position detecting. However, for example, a side-view-type light source can be used by being mounted in a front or rear position deviated from the center line on the inner face of the turned-over portion. Even when such a light source of the side-view-type is used, the light source is mounted in an inclined posture with respect to the longitudinal direction of the wiring substrate 12' as described above. In any case, the position detecting beam sources 11A to 11D are completely enclosed by the wiring substrate 12' according to this embodiment and the corners of the light guide plate 13'. Accordingly, the positions of the position determining light sources can be determined with respect to the light guide plate 13' in an easy manner and can be attached to the light guide plate 13' to be maintained for serving as a unit.

Fourth Embodiment

Next, a fourth embodiment of the invention will be described with reference to FIGS. 5A and 5B. In this embodiment, to each part that is the same as that of the above-described third embodiment, a same reference sign is assigned, and a description thereof is omitted here. FIG. 5B represents only a wiring substrate 12A' between wiring substrates 12A' and 12C' according to this embodiment. However, basically, the wiring substrate 12C' has a same configuration as that of the wiring substrate 12A', and a drawing thereof is omitted here.

Figure 5A:
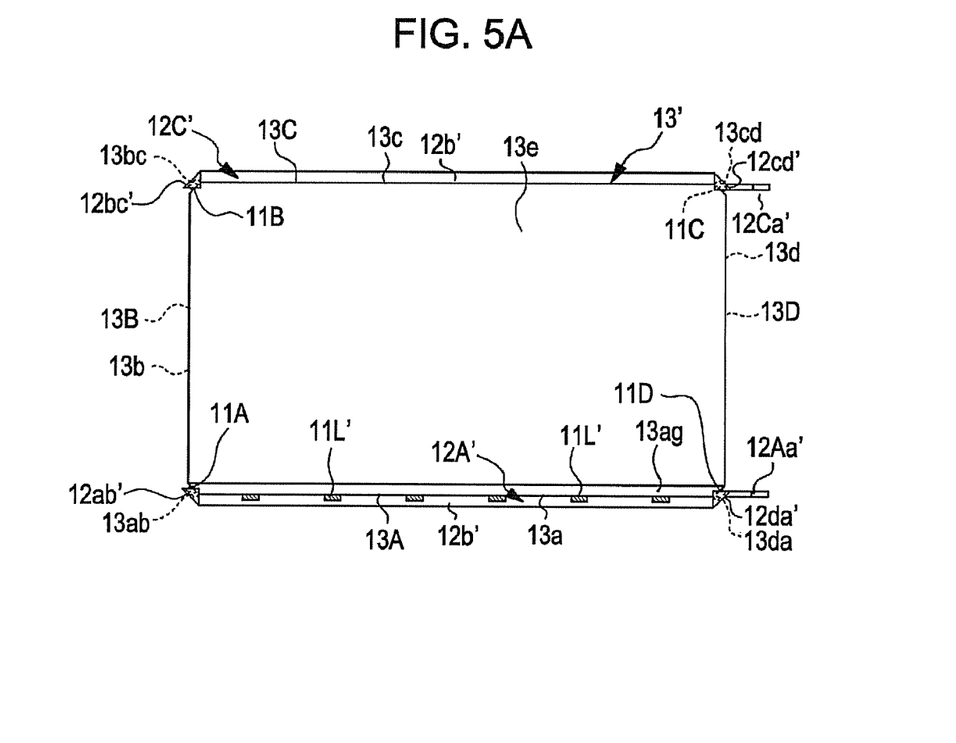
FIG. 5A is a plan view showing positional relationship between light sources and a light guide plate according to a fourth embodiment of the invention.
Figure 5B:
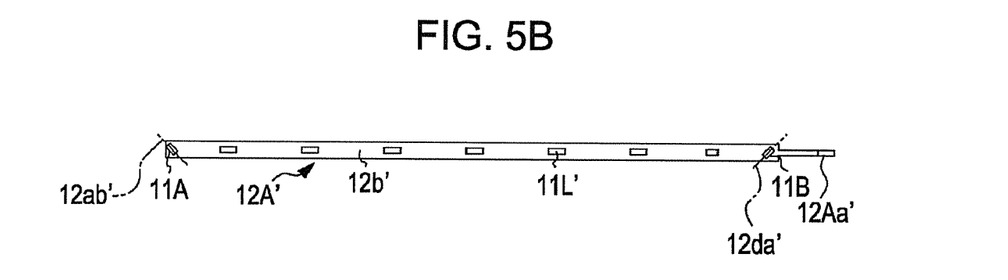
FIG. 5B is a plan view of a wiring substrate according to the fourth embodiment.

As shown in FIG. 5A, in this embodiment, illumination light sources 11L' that are the same as those of the third embodiment are arranged along a light incident face 13a of a light guide plate 13', and position detecting beam sources 11A to 11D are disposed to face corners 13ab, 13bc, 13cd, and 13da of the light guide plate 13'. However, according to this embodiment, the position detecting beam sources 11A and 11D and 11B and 11C are mounted on two substrates including a wiring substrate 12A' disposed along a side 13A of the light guide plate 13' and a wiring substrate 12C' disposed along a side 13C, which is different from the third embodiment.

As shown in FIG. 5B, in the wiring substrate 12A', a plurality of illumination light sources 11L' is arranged along the light incident face 13a of the side 13A of the light guide plate 13' so as to be mounted, and a light guide plate substrate face 12b' is disposed in a posture disposed along the surface of the light guide plate 13'. In addition, on both end portions of the wiring substrate 12A', the position detecting beam sources 11A and 11D are mounted in a posture inclined with respect to the longitudinal direction of the wiring substrate 12A' along the center lines 12ab' and 12da' of turned-over portions, same as in the third embodiment. Both the end portions are turned over, same as in the third embodiment, and the position detecting beam sources 11A and 11D disposed on the inner side thereof are disposed to face corners 13ab and 13da. In addition, on an end portion on one side, a connection terminal part 12Aa' protrudes.

On the other hand, basically, the wiring substrate 12C' has the same configuration as that of the wiring substrate 12A'. Thus, a description thereof will be made below by using the reference signs shown in FIG. 5A, and a drawing in FIG. 5B is omitted. The wiring substrate 12C' extends along the side 13C, and on both end portions of the wiring substrate 12C', the position detecting beam sources 11B and 11C are mounted in a posture inclined with respect to the longitudinal direction of the wiring substrate 12C' along the center lines 12bc' and 12cd' of the turned-over portions. Both end portions 12C1' and 12C2' are turned over as described above, and on the inner side of the turned-over portions, the position detecting beam sources 11B and 11C are disposed to face the corners 13bc and 13cd. In addition, in the end portion on one side, a connection terminal part 12Ca' is disposed to protrude.

According to this embodiment, all the illumination light sources 11L' and the position detecting beam sources 11A to 11D are mounted on the wiring substrate 12A', which is the same as in each of the above-described embodiments (particularly, the third embodiment). However, the position detecting beam sources 11B and 11C are mounted on another wiring substrate 12C', so that the wiring substrates 12A' and 12C' are disposed along the sides 13A and 13C of the light guide plate 13' that face each other, which is different from the above-described embodiment. Under such a configuration, the lead-out amount on the periphery of the light guide plate 13' can be reduced, and accordingly, simplification of the structure of the illumination device can be achieved.

In addition, in this embodiment, a plurality of the illumination light sources 11L' that is arranged along the light incident face 13c of the side 13C may be mounted on the wiring substrate 12C'.

Fifth Embodiment

Figure 6A:
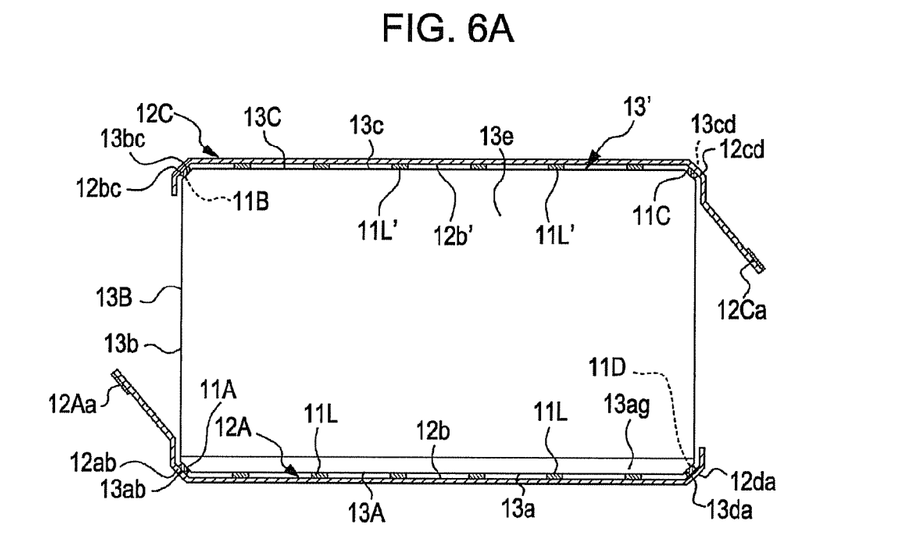
FIG. 6A is a plan view showing positional relationship between light sources and a light guide plate according to a fifth embodiment of the invention.
Figure 6B:
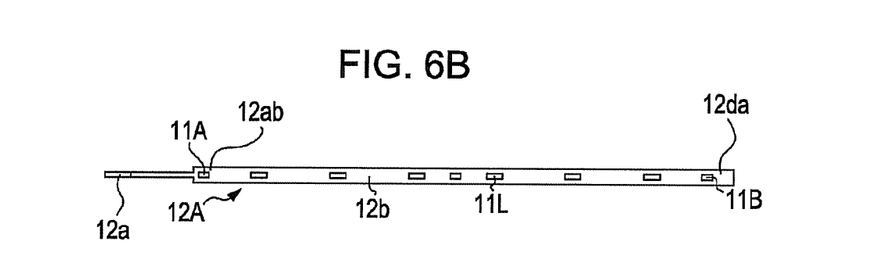
FIG. 6B is a plan view of a wiring substrate according to the sixth embodiment.

Next, a fifth embodiment of the invention will be described with reference to FIGS. 6A and 6B. In this embodiment, to each part that is the same as that of the second embodiment, a same reference sign is assigned, and a description thereof is omitted here. In FIG. 6B, only one wiring substrate 12A is represented, and a drawing of the other wiring substrate 12C is omitted, which is the same as that of the fourth embodiment.

According to this embodiment, same as in the first and second embodiments, a wiring substrate 12A in which a plurality of illumination light sources 11L and position detecting beam sources 11A and 11D, which are disposed on a light incident face 13a of a light guide plate 13' to face each other, are mounted is included. In addition, the wiring substrate 12A is disposed in a posture in which a substrate face 12b faces an end face of the light guide plate 13'. In addition, same as in the second embodiment, the position detecting beam sources 11A and 11D are disposed to face corners 13ab and 13da. In addition, same as in the first and second embodiments, the illumination light sources 11L and the position detecting beam sources 11A and 11D are arranged in a same posture along the longitudinal direction of the wiring substrate 12A.

However, in this embodiment, the position detecting beam sources 11A and 11D are mounted on both end portions 12ab and 12da of the wiring substrate 12A. As both the end portions 12ab and 12da are refracted along the corners of the light guide plate 13', the position detecting beam sources 11A and 11D are disposed to face the corners 13ab and 13da of the light guide plate 13'. In addition, a connection terminal part 12Aa is formed to extend from one end portion 12ab of the wiring substrate 12A.

In addition, according to this embodiment, in addition to the above-described wiring substrate 12A, a wiring substrate 12C on which the illumination light sources 11L and position detecting beam sources 11B and 11C are mounted is included, which is different from the second embodiment. On the wiring substrate 12C, the illumination light sources 11L are mounted along a light incident face 13c of a side 13C, and position detecting beam sources 12B and 12C are mounted on both end portions 12bc and 12cd. In addition, a connection terminal part 12Ca is formed to extend from one end portion 12cd.

On this wiring substrate 12C, the position detecting beam sources 12B and 12C are mounted in a posture formed along the longitudinal direction. Thus, as both the end portions 12bc and 12cd are refracted along the corners of the light guide plate 13', the position detecting beam sources 12B and 12C are disposed to face the corners 13bc and 13cd.

According to this embodiment, all the illumination light sources 11L and the position detecting beam sources 11A and 11D and 11B and 11C are mounted on the wiring substrates 12A and 12C, which is the same as each of the above-described embodiments (particularly, the second embodiment). However, on two wiring substrates 12A and 12C, the illumination light sources 11L and the position detecting beam sources 11A to 11D are mounted, and the wiring substrates 12A and 12C are disposed along the sides 13A and 13C of the light guide plate 13' that face each other, which is different from the above-described embodiments. However, even under such a configuration, the lead-out amount of the periphery of the light guide plate 13' can be decreased, and accordingly, simplification of the structure of the illumination device can be achieved.

In addition, in this embodiment, the plurality of the illumination light sources 11L that is arranged along the light incident face 13c of the side 13C may be omitted in the wiring substrate 12C.

The illumination device and the electro-optical device according to embodiments of the invention are not limited to the above-described examples of the drawings. It is apparent that various changes may be made therein without departing from the gist of the invention. For example, in the above-described embodiments, an example in which position information of a flat-shaped target object in the plane direction (directions X and Y) that is overlapped with the light emitting face of the light guide plate in the plan view is acquired by using four position detecting beam sources has been described. However, when at least two position detecting beam sources are disposed, the position information on the light emitting face corresponding to a direction for connecting the light sources can be acquired.

Electronic Apparatus

Figure 7:
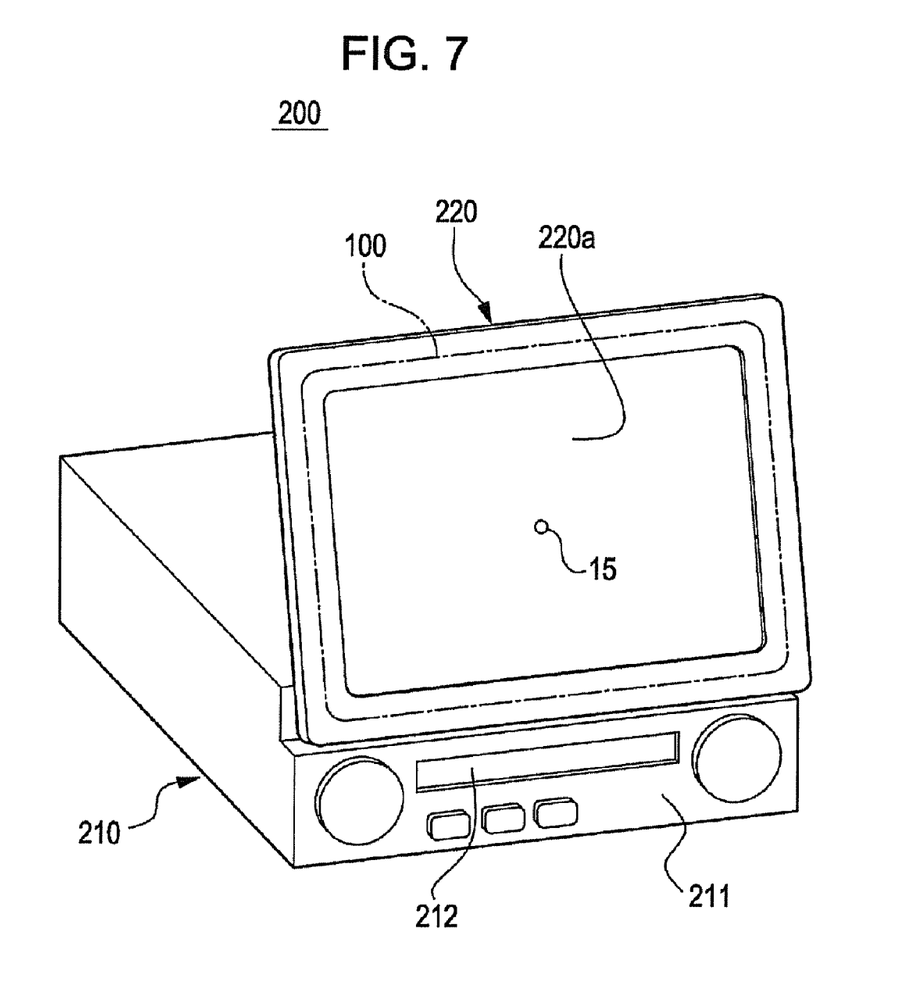
FIG. 7 is an external perspective view of an electronic apparatus according to an embodiment of the invention.

Finally, an electronic apparatus according to an embodiment of the invention on which the above-described various electro-optical devices 100 are mounted will be described with reference to FIGS. 7 and 8. FIG. 7 is a schematic perspective view showing an appearance of an example of an electronic apparatus according to an embodiment of the invention. The electronic apparatus 200 of the shown example is a vehicle-built-in car navigation system. The electronic apparatus 200 includes a main body 210 and a display unit 220 that is connected to the main body 210. In the main body 210, an operation face 211 in which operation buttons or the like are disposed is installed, and an introduction port 212 for a recording medium such as a DVD is installed. Inside the display unit 220, the above-described electro-optical device 100 is housed, and an image, which is formed in a display area of the electro-optical device 100, that is, a navigation image is configured to be visually recognized in a display screen 220a of the display unit 220.

In addition, by disposing a target object Ob such as a finger or a touch pen on the display screen 220a, the above-described position detecting beams La to Ld is reflected so as to be detected by the light detector 15. Thereby, the position information of the target object Ob on the display screen can be input. In addition, the light detector 15, as described above, is installed on the surface of the display screen 220a for a case where the display screen 220a is configured as a mounting plate 30. However, the installation position of the light detector 15 is not limited to the surface. For example, the light detector 15 may be fixed to a lower face of the mounting plate 30. Moreover, the light detector 15 may be installed inside the electro-optical panel 20.

Figure 8:
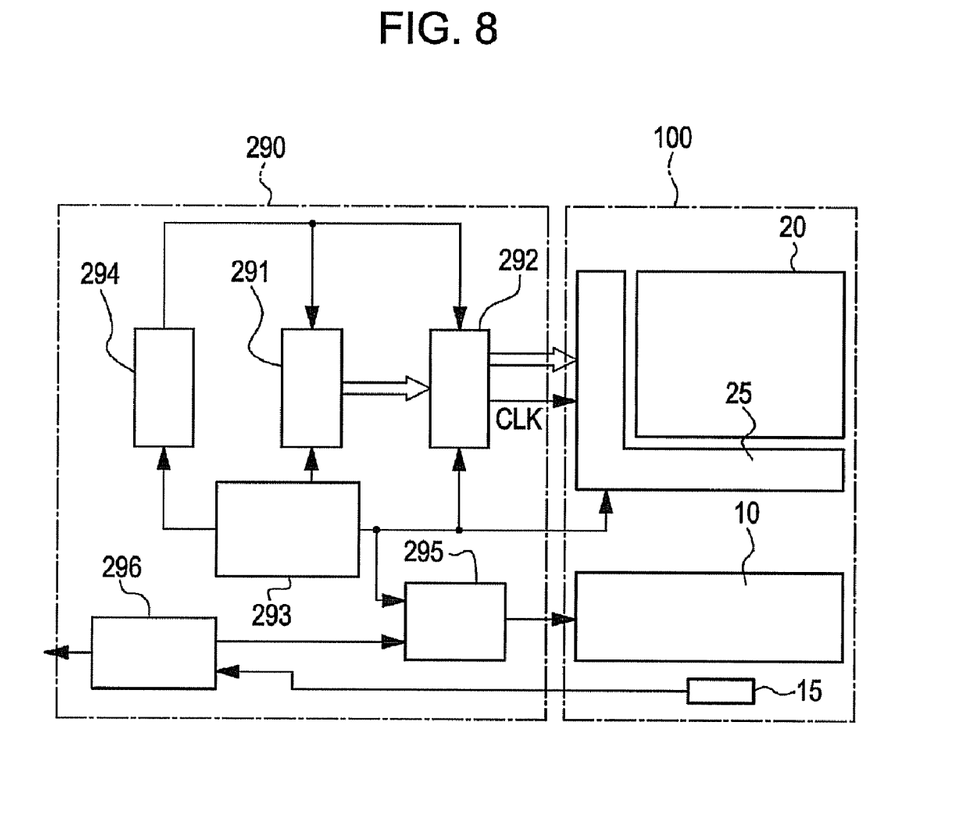
FIG. 8 is a schematic configuration diagram of a display control system of an electronic apparatus according to an embodiment of the invention.

FIG. 8 is a schematic configuration diagram showing the whole configuration of a control system (display control system) of the electronic apparatus 200 for the electro-optical device 100. The electronic apparatus 200 has a display control circuit 290 that includes a display information outputting source 291, a display information processing circuit 292, a power supply circuit 293, a timing generator 294, and a light source control circuit 295 that supplies power to the illumination device 10. In addition, in the electro-optical device 100, an electro-optical panel 20 having the above-described configuration, a driving circuit 25 that drives the electro-optical panel 20 and the illumination device 10 as a back light are installed. This driving circuit 25 is configured by an IC chip or the like that is directly mounted on the electro-optical panel 20. The driving circuit 25 may be configured by an electronic component or a circuit pattern that is formed on the surface of the substrate of the electro-optical panel 20 or an IC chip, a circuit pattern, or the like that is mounted on a circuit substrate electrically connected to the electro-optical panel 11, instead of using the above-described configuration.

The display information outputting source 291 includes a memory that is formed of a ROM (Read Only Memory), a RAM (Random Access Memory), or the like, a storage unit that is formed of a magnetic recording disk, an optical recording disc, or the like, and a resonance circuit that synchronously outputs a digital image signal. The display information outputting source 291 is configured to supply display information in the form of an image signal having a predetermined format or the like to the display information processing circuit 292 based on various clock signals that are generated by the timing generator 294.

The display information processing circuit 292 includes various known circuits such as a serial-to-parallel conversion circuit, an inverted amplifier circuit, a rotation circuit, a gamma-correction circuit, and a clamp circuit. The display information processing circuit 292 processes the input display information and supplies the image information to the driving circuit 25 together with the clock signal CLK. The driving circuit 25 includes a scanning line driving circuit, a signal line driving circuit, and a test circuit. In addition, the power supply circuit 293 supplies predetermined voltages to the above-described constituent elements.

The light source control circuit 295 is configured to control turning on or off the light sources and the brightness of the light sources based on a predetermined control signal by supplying power to the light sources (the illumination light sources 11L, 11L' and the position detecting beam sources 11A to 11D) of the illumination device 10 based on the voltages supplied from the power supply circuit 293. This light source control circuit 295 drives the position detecting beam sources 11A to 11D in accordance with a direction from the coordinate detecting circuit 296 by using the method described in the first embodiment. The coordinate detecting circuit 296 acquires the position information (coordinates) of the target object Ob based on the control states of the position detecting beam sources 11A to 11D and a detection signal from the light detector 15 by controlling the light source control circuit 295 and receiving the detection signal of the light detector 15. The position information acquired as above is transmitted to a control unit, which is not shown in the figure, of the electronic apparatus so as to be used for various control operations. In other words, the light source control circuit 295 and the coordinate detecting circuit 296 configure a coordinate detecting unit that is configured in the illumination device 10 and a coordinate inputting device of the electronic apparatus 200.

As the electronic apparatuses according to embodiments of the invention, there are a liquid crystal television set, a cellular phone, an electronic watch, an electronic organizer, a calculator, a workstation, a video phone, a POS terminal, and the like, in addition to the car navigation system shown in FIG. 7. The electro-optical device according to an embodiment of the invention can be used as a display unit of these various electronic apparatuses, and accordingly, the position information of the target object Ob such as a finger or a touch pen placed on the display face can be detected in an easy manner.

The electro-optical device and the electronic apparatus according to embodiments of the invention are not limited to the above-described examples of drawings. Thus, it is apparent that various changes may be made therein without departing from the gist of the invention.

What is claimed is:

1. An illumination device comprising:
Illumination light sources emitting illumination light; a light guide plate that has a plurality of light incident faces including first and second light incident faces, and the light guide plate has a light emitting face through which the illumination light exits from the light guide plate, the light guide plate having a plate-shaped body; a plurality of position detecting beam sources that include a first position detecting beam source emitting first detection light and a second position detecting, beam source emitting second detection light and, a wiring substrate that has a first substrate face facing the first light incident face and a second substrate face facing the second light incident face, wherein the illumination light sources and the first position detecting beam source are mounted on the first substrate face, the second position detecting beam source is mounted on the second substrate face, the illumination light and the first detection light enter the light guide plate through the first light incident, and the second detection light enters the light guide plate through, the second light incident face.

2. An illumination device comprising:
Illumination light sources emitting illumination light; a light guide plate that has a plurality of light incident faces including first, second, and third light incident faces; a plurality of position detecting beam sources that include a first position detecting beam source emitting first detection light, a second position detecting beam source emitting second detection light, and a third position detecting beam source emitting third detection light; and a wiring substrate that has a first substrate face facing the first light incident face, a second substrate face facing the second light incident face, and a third substrate face facing the third light incident face, wherein the illumination light sources and the first position detecting beam source are mounted on the first substrate face, the second position detecting beam source is mounted on the second substrate face, the third position detecting beam source is mounted on the third substrate face, the illumination light and the first detection light enter the light guide plate through the first incident face, the second detection light enters the light guide plate through the second light incident face, and the third detection light enters the light guide plate through the third light incident face.

3. The illumination device according to claim 1, the first detection light and the second detection light exiting from the light emitting face.

4. The illumination device according claim 2, the third detection light exiting from the light emitting face.

5. The light illumination device according to claim 1, the first light incident face being positioned at a first side of the light guide plate, the second light incident face being positioned at a second side, which is different from the first side, of the light guide plate.

6. The illumination device according to claim 1, the wiring substrate covering at least a part of an end face of the light guide plate.

7. An illumination device comprising:
Illumination light sources emitting illumination light; a light guide plate that has a plurality of light incident faces including first, second, third, and fourth light incident faces; a plurality of position detecting beam sources that include a first position detecting beam source emitting first detection light, a second position detecting beam source emitting second detection light, a third position detecting beam source emitting third detection light and a fourth position detecting beam source emitting fourth detection light; and a wiring substrate that has a first substrate face facing the first light incident face, a second substrate face facing the second light incident face, a third substrate face facing the third light incident face, and a fourth substrate face facing the fourth light incident face, wherein the illumination light sources and the first position detecting beam source are mounted on the first substrate face, the second position detecting beam source is mounted on the second substrate face, the third position detecting beam source is mounted on the third substrate face, the fourth position detecting beam source is mounted on the fourth substrate face, the illumination light and the first detection light enter the light guide plate through the first incident face, the second detection light enters the light guide plate through the second light incident face, the third detection light enters the light guide plate through the third light incident face, the fourth detection light enters the light plate through the fourth light incident face.

8. The illumination device according to claim 7,
a first optical axis of the illumination light intersecting a plane of the wiring substrate, and
a second optical axis of the first detection light intersecting the plane of the wiring substrate.

9. The light illumination device according to claim 1,
an object to be detected being irradiated with the first detection light.

10. The illumination device according to claim 7,
the first detection light exiting from a light emitting face of the light guide plate.

11. The illumination device according to claim 7,
the wiring substrate covering at least a part of an end face of the light guide plate.

* * * * *